(12) United States Patent
Mishima et al.

(10) Patent No.: US 10,247,174 B2
(45) Date of Patent: Apr. 2, 2019

(54) SOLAR THERMAL POWER GENERATION SYSTEM AND SOLAR THERMAL POWER GENERATION METHOD

(71) Applicant: Mitsubishi Hitachi Power Systems, Ltd., Nishi-ku, Yokohama (JP)

(72) Inventors: Nobuyoshi Mishima, Yokohama (JP); Naoyuki Nagafuchi, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 189 days.

(21) Appl. No.: 15/195,229

(22) Filed: Jun. 28, 2016

(65) Prior Publication Data

US 2017/0002799 A1 Jan. 5, 2017

(30) Foreign Application Priority Data

Jun. 30, 2015 (JP) ................. 2015-131553

(51) Int. Cl.
*F03G 6/00* (2006.01)
*F03G 6/06* (2006.01)
(Continued)

(52) U.S. Cl.
CPC ............... *F03G 6/003* (2013.01); *F01K 3/06* (2013.01); *F03G 6/065* (2013.01); *F22B 1/006* (2013.01);
(Continued)

(58) Field of Classification Search
CPC . F03G 6/00; F03G 6/003; F03G 6/005; F03G 6/06; F03G 6/065; F03G 6/067;
(Continued)

(56) References Cited

U.S. PATENT DOCUMENTS 3,803,836 A * 4/1974 Gilli .................. F01K 3/14
60/698
4,192,144 A * 3/1980 Pierce .................. F01K 3/00
122/28

(Continued)

FOREIGN PATENT DOCUMENTS

JP 61038111 A * 2/1986 ............. F03G 6/065
JP 2014-92086 A 5/2014

*Primary Examiner* — Laert Dounis
(74) *Attorney, Agent, or Firm* — Crowell & Moring LLP (57) ABSTRACT

A solar thermal power generation system includes a solar heat collection system that generates superheated steam by solar heat, a main power generation system that performs power generation by part of the superheated steam generated by the solar heat collection system, a solar heat storage/release system that stores heat in a heat storage medium or releases the heat stored in the heat storage medium, and a secondary power generation system that performs power generation by saturated steam generated by the heat storage or the heat release in the solar heat storage/release system. The solar heat storage/release system includes a heat storage heater for exchanging heat between the rest of the superheated steam generated by the solar heat collection system and the heat storage medium to store heat in the heat storage medium and to generate saturated steam, a low-temperature tank for containing the heat storage medium to be supplied to the heat storage heater, and a high-temperature tank for containing the heat storage medium after the heat storage in the heat storage heater. The secondary power generation system includes a saturated steam turbine into which the saturated steam generated by the heat storage heater can be introduced.

9 Claims, 5 Drawing Sheets (51) Int. Cl.
*F01K 7/16* (2006.01)
*F01K 3/06* (2006.01)
*F22B 1/00* (2006.01)
*F24S 60/00* (2018.01)

(52) U.S. Cl.
CPC ............... *F24S 60/00* (2018.05); *F01K 7/165* (2013.01); *Y02E 10/46* (2013.01); *Y02E 60/14* (2013.01)

(58) Field of Classification Search
CPC ......... F03G 2006/008; F03G 2006/061; F03G 2006/062; Y02E 10/46; Y02E 60/14–60/147; F24J 2/34–2/345; F24S 60/00–60/30
USPC ............................................ 60/641.8–641.15
See application file for complete search history.

(56) References Cited

U.S. PATENT DOCUMENTS

| | | | | |
|---|---|---|---|---|
| 4,291,537 | A * | 9/1981 | Oplatka | ................... F01K 3/004 60/652 |
| 2012/0255300 | A1* | 10/2012 | Birnbaum | ............... F03G 6/065 60/641.8 |
| 2013/0285380 | A1* | 10/2013 | Afremov | ................... F24J 2/07 290/52 |
| 2013/0307273 | A1* | 11/2013 | Afremov | ................... F03G 6/02 290/52 |
| 2015/0167499 | A1 | 6/2015 | Shinozaki et al. | |

* cited by examiner

A: FIRST STEAM FLOW CONTROL VALVE
B: SECOND STEAM FLOW CONTROL VALVE

Fig. 5

J: WHOLE SOLAR THERMAL POWER GENERATION SYSTEM
K: MAIN POWER GENERATION SYSTEM
L: SECONDARY POWER GENERATION SYSTEM

SOLAR THERMAL POWER GENERATION SYSTEM AND SOLAR THERMAL POWER GENERATION METHOD

BACKGROUND OF THE INVENTION

1. Field of the Invention

The present invention relates to a solar thermal power generation system and a solar thermal power generation method, and in particular, to a solar thermal power generation system including a heat storage system capable of storing solar heat and releasing of the stored solar heat, and a method of power generation by the power generation system.

2. Description of the Related Art

There exist solar thermal power generation systems capable of performing power generation by collecting solar heat while storing the collected solar heat and also capable of performing power generation by releasing the stored solar heat. JP-2014-92086-A discloses a solar thermal power generation system (solar thermal power generation plant) designed to simplify the heat medium cycle of the whole power generation system by integrating a heat medium cycle for collecting the solar heat and a heat medium cycle for driving a steam turbine together. For the purpose, the solar thermal power generation system includes a solar heat collection unit that uses water/steam as the heat medium for collecting the solar heat and generates superheated steam from water by the solar heat, steam turbine power generation equipment that performs power generation by driving the steam turbine with the superheated steam generated by the solar heat collection unit, and a solar heat storage/release unit that uses molten salt or oil as a heat storage medium and stores the solar heat by performing heat exchange between the heat medium (water/steam) after recovering the solar heat and the heat storage medium. In the solar thermal power generation system described in JP-2014-92086-A, in order to efficiently store the solar heat recovered by the heat medium of the solar heat collection unit, the solar heat storage/release unit stores the solar heat in three temperature ranges depending on the state of the heat medium (water/steam) in the process ranging from superheated steam to subcooled water.

SUMMARY OF THE INVENTION

In the solar thermal power generation system described in JP-2014-92086-A, to store the heat in three temperature ranges, heat exchangers corresponding to three states of the heat medium (water/steam) are necessary. Specifically, three types of heat exchangers are necessary: a steam heat exchanger that stores sensible heat of the superheated steam in molten salt by heat exchange between the superheated steam and the molten salt, a saturated steam condenser that stores latent heat of the saturated steam in molten salt by heat exchange between the saturated steam and the molten salt, and a saturated water heat exchanger that stores sensible heat of saturated water in oil by heat exchange between the saturated water and the oil.

Further, in the solar thermal power generation system described in JP-2014-92086-A, to store the heat in three temperature ranges, at least three heat storage/release tanks for containing molten salt or oil are necessary. In these tanks, the inside is separated into an upper part and a lower part by a heat insulating member, a heat storage medium (molten salt or oil) after storing solar heat is contained in the upper part, and the heat storage medium before storing heat is contained in the lower part. In cases where a great amount of heat storage medium has to be contained, separating the inside of the tank into the upper part and the lower part by the heat insulating member is supposed to be structurally difficult due to the weight of the heat storage medium. Thus, for the heat storage in three temperature ranges, a total of six tanks practically are necessary as the tanks for containing the heat storage media after the heat storage and the tanks for containing the heat storage media before the heat storage.

As above, in the solar thermal power generation system described in JP-2014-92086-A, the solar heat storage/release unit efficiently stores the collected solar heat by using three heat exchangers and practically six tanks. Thus, the solar heat storage/release unit is necessitated to be complicated and that leads to increase in the construction costs of the solar thermal power generation system.

The present invention has been made to solve the foregoing problem and it is an object of the present invention to provide a solar thermal power generation system and a solar thermal power generation method in which the solar heat storage/release system can be simplified and the construction costs can be reduced while the efficient use of the collected solar heat is also achieved.

To solve the foregoing problem, the present invention incorporates configurations as defined in the appended claims. This application includes a plurality of means for solving the foregoing problem. In one aspect, a solar thermal power generation system includes a solar heat collection system that uses water/steam as a heat medium, the solar heat collection system being configured to generate superheated steam from water by collecting solar heat, a main power generation system that uses the heat medium in common with the solar heat collection system, the main power generation system being configured to perform power generation by using part of the superheated steam generated by the solar heat collection system, a solar heat storage/release system that uses a heat storage medium different from the heat medium of the solar heat collection system, the solar heat storage/release system being configured to store heat in the heat storage medium by heat exchange with the rest of the superheated steam generated by the solar heat collection system and to release the heat stored in the heat storage medium, and a secondary power generation system that uses the heat medium in common with the solar heat collection system, the secondary power generation system being configured to perform power generation by using saturated steam generated from the heat medium by heat storage or heat release of the heat storage medium in the solar heat storage/release system. The main power generation system includes a steam turbine into which part of the superheated steam generated by the solar heat collection system is introduced and a main generator driven by the steam turbine. The solar heat storage/release system includes a heat storage heater for exchanging heat between the rest of the superheated steam generated by the solar heat collection system and the heat storage medium to store heat in the heat storage medium and to generate saturated steam from the superheated steam, a low-temperature tank for containing the heat storage medium to be supplied to the heat storage heater, and a high-temperature tank for containing the heat storage medium after storing heat in the heat storage heater. The secondary power generation system includes a saturated steam turbine into which the saturated steam generated by the heat storage heater can be introduced and a secondary generator driven by the saturated steam turbine.

According to the present invention, the steam turbine is driven with part of the superheated steam generated by solar heat and thereby generates electric power. Further, by the heat exchange in the heat storage heater between the rest of the superheated steam and the heat storage medium from the low-temperature tank, sensible heat of the superheated steam is stored in the heat storage medium while saturated steam is generated from the superheated steam. The heat storage medium after the heat storage is contained in the high-temperature tank, and the saturated steam turbine is driven with the saturated steam to generate electric power. Therefore, the solar heat storage/release system is simplified and the construction costs can be reduced while the efficient use of the collected solar heat is also achieved.

Problems, configurations and effects other than those described above will become apparent from the following description of the embodiments.

DESCRIPTION OF THE PREFERRED EMBODIMENTS

Embodiments of a solar thermal power generation system and a solar thermal power generation method according to the present invention will be described below with reference to drawings.

Embodiment

First, a system configuration of a solar thermal power generation system and a solar thermal power generation method according to an embodiment of the present invention will be described below with reference to FIGS. 1 and 2.

Figure 1:
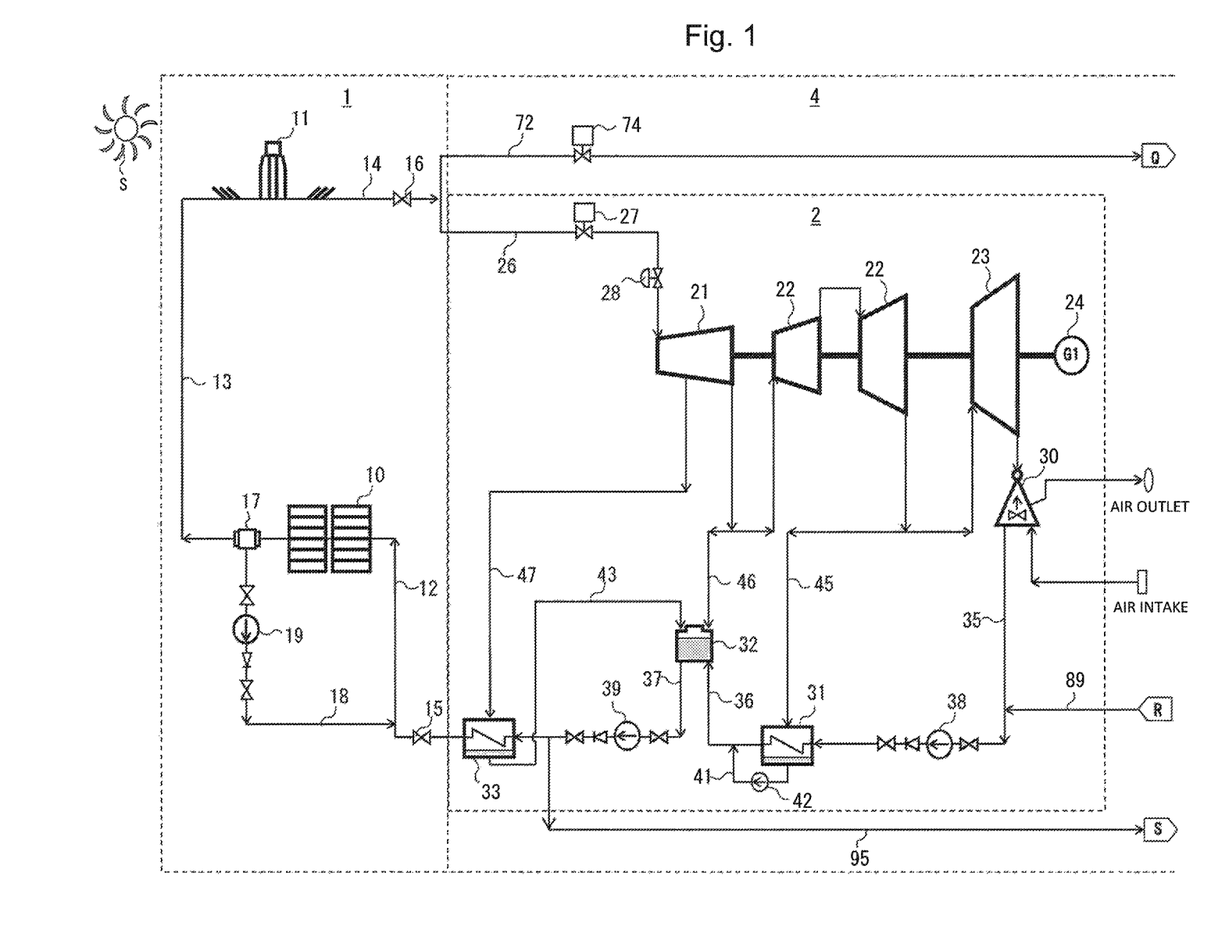
FIG. 1 is a configuration diagram showing a solar heat collection system and a main power generation system constituting part of a solar thermal power generation system according to an embodiment of the present invention.

FIG. 1 is a configuration diagram showing a solar heat collection system and a main power generation system constituting part of the solar thermal power generation system according to the embodiment of the present invention. FIG. 2 is a configuration diagram showing a solar heat storage/release system and a secondary power generation system constituting the other part of the solar thermal power generation system according to the embodiment of the present invention. In FIG. 1, arrows indicate the flow of a heat medium (water/steam) of the solar thermal power generation system. In FIG. 2, arrows indicate the flow of a heat medium (water/steam) or a heat storage medium (molten salt) of the solar thermal power generation system. In FIGS. 1 and 2, the reference characters Q, R and S respectively represent tie-in points of a second main steam pipe 72, a condensate confluence pipe 89 and a feed water branch pipe 95 extending over FIGS. 1 and 2.

Figure 2:
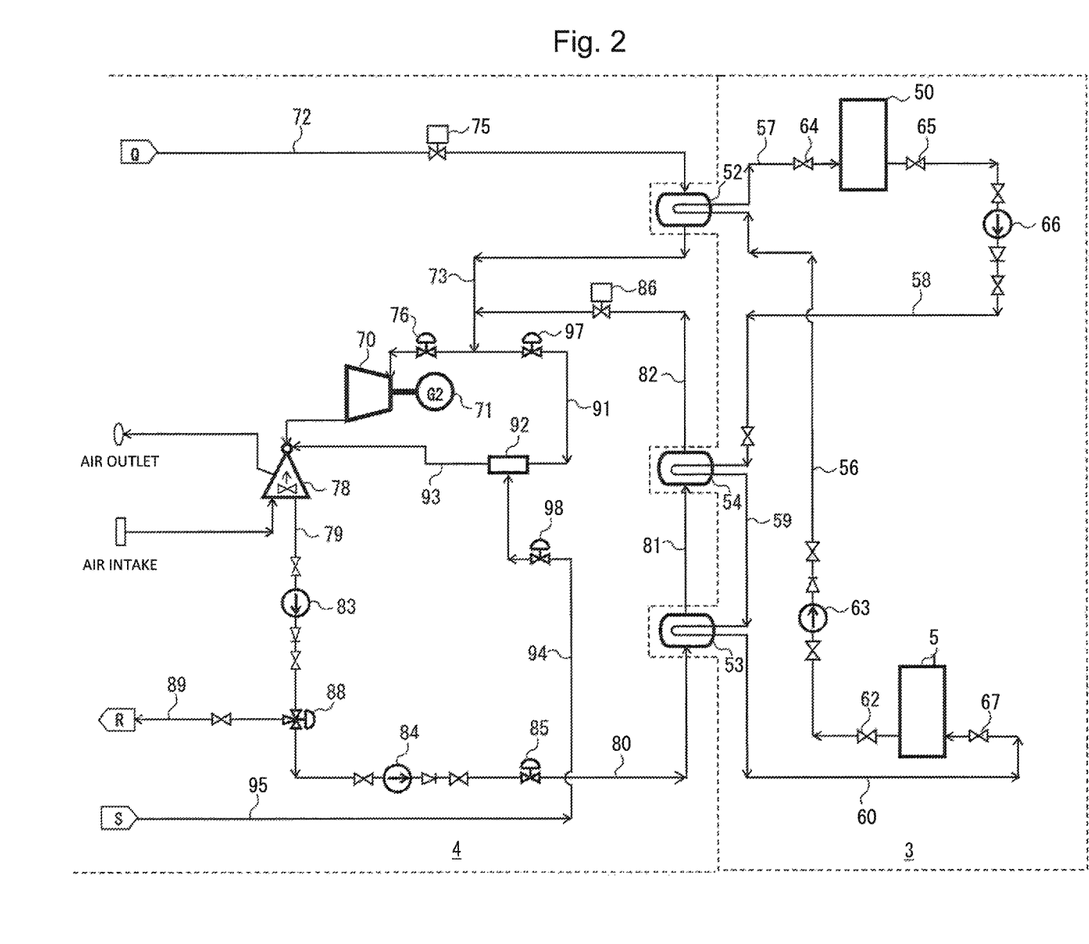
FIG. 2 is a configuration diagram showing a solar heat storage/release system and a secondary power generation system constituting the other part of the solar thermal power generation system according to the embodiment of the present invention.

In FIGS. 1 and 2, the solar thermal power generation system includes a solar heat collection system 1, a main power generation system 2, a solar heat storage/release system 3 and a secondary power generation system 4. The solar heat collection system 1 uses water/steam as a heat medium and generates superheated steam from water by collecting solar heat. The main power generation system 2 uses the heat medium in common with the solar heat collection system 1 and performs power generation by using part of the superheated steam generated by the solar heat collection system 1. The solar heat storage/release system 3 uses a heat storage medium different from the heat medium of the solar heat collection system 1. The solar heat storage/release system 3 stores heat in the heat storage medium by heat exchange with the rest of the superheated steam generated by the solar heat collection system 1 and releases the stored heat from the heat storage medium. The secondary power generation system 4 uses the heat medium in common with the solar heat collection system 1 and performs power generation by using saturated steam generated from the heat medium (superheated steam or water) by the heat storage or the heat release of the heat storage medium in the solar heat storage/release system 3. By the use of the common heat medium (water/steam) in the solar heat collection system 1, the main power generation system 2 and the secondary power generation system 4, heat medium cycles for the solar heat collection of the solar heat collection system 1, the power generation of the main power generation system 2 and the power generation of the secondary power generation system 4 are integrated together and the heat medium cycle of the whole power generation system is simplified. As the heat storage medium for storing the solar heat and releasing the stored heat in the solar heat storage/release system 3, nitrate salt-based molten salt is used, for example.

The solar heat collection system 1 includes, for example, a solar heat evaporator 10 that generates the saturated steam by heating the water (feed water) as the heat medium with the solar heat and a solar heat superheater 11 that is connected in series with the solar heat evaporator 10 and generates the superheated steam by superheating the saturated steam generated by the solar heat evaporator 10. The solar heat evaporator 10 is, for example, a Fresnel-type solar heat collector of the linear heat collection type that linearly condenses the solar beam into a rodlike heat collector pipe by reflecting the solar beam with a lot of reflecting mirrors. The solar heat superheater 11 is, for example, a tower-type solar heat collector of the point heat collection type that condenses the solar beam into one point on the heat collector by reflecting the solar beam with a lot of plane mirrors (heliostats).

Connected to the inlet of the solar heat evaporator 10 is a solar heat evaporator feed water pipe 12 for supplying feed water from a condensate feed water system of the main power generation system 2 which will be explained later. A solar heat superheater steam pipe 13 is connected to the outlet of the solar heat evaporator 10 and to the inlet of the solar heat superheater 11. A solar heat superheater outlet pipe 14 is connected to the outlet of the solar beat superheater 11. The solar heat superheater outlet pipe 14 branches into a first main steam pipe 26 of the main power generation system 2 which will be explained later and a second main steam pipe 72 of the secondary power generation system 4 which will be explained later. The solar heat evaporator feed water pipe 12 is provided with a feed water stop valve 15 for opening and closing the solar heat evaporator feed water pipe 12. The solar heat superheater outlet pipe 14 is provided with a main steam stop valve 16 for opening and closing the solar heat superheater outlet pipe 14. A steam separator 17 is disposed in the middle of the solar heat superheater steam pipe 13. A return pipe 18 is connected at one end to the steam separator 17 and connected at the other end to a portion of the solar heat evaporator feed water pipe 12 on the downstream side of the feed water stop valve 15. The return pipe 18 is provided with a circulation pump 19.

The main power generation system 2 includes a steam turbine constituted of a high-pressure steam turbine 21, an intermediate-pressure steam turbine 22 (turbine separated into two in FIG. 1) and a low-pressure steam turbine 23, the condensate feed water system for the steam turbine, and a main generator 24 driven by the steam turbine. Part of the superheated steam generated by the solar heat collection system 1 is introduced into the high-pressure steam turbine 21 via the first main steam pipe 26 branching from the solar heat superheater outlet pipe 14 of the solar heat collection system 1. The first main steam pipe 26 is provided with a first steam flow control valve 27 and a main steam regulating valve 28 on the downstream side of the first steam flow control valve 27. The first steam flow control valve 27 controls the flow rate ratio of the superheated steam flowing from the solar heat superheater outlet pipe 14 of the solar heat collection system 1 to the first main steam pipe 26 and the second main steam pipe 72 in cooperation with a second steam flow control valve 74 of the secondary power generation system 4 which will be explained later.

The condensate feed water system of the main power generation system 2 includes a first air-cooled steam condenser 30 that cools down exhaust steam from the low-pressure steam turbine 23 with air and thereby returns the exhaust steam to the condensed water, a low-pressure feed water heater 31 that heats up the condensed water from the first air-cooled steam condenser 30, a deaerator 32 that heats and deaerates the condensed water from the low pressure feed water heater 31, and a high-pressure feed water heater 33 that heats up feed water from the deaerator 32. The condensate feed water system further includes a first condensate pipe 35 connected to the outlet of the first air-cooled steam condenser 30 and to the inlet of the low-pressure feed water heater 31, a deaerator inlet pipe 36 connected to the outlet of the low-pressure feed water heater 31 and to the inlet of the deaerator 32, and a feed water pipe 37 connected to the outlet of the deaerator 32 and to the inlet of the high-pressure feed water heater 33. The solar heat evaporator feed water pipe 12 of the solar heat collection system 1 is connected to the outlet of the high-pressure feed water heater 33, by which the heat medium path of the main power generation system 2 and the heat medium path of the solar heat collection system 1 are integrated into one path. The first condensate pipe 35 is provided with a first condensate pump 38. The feed water pipe 37 is provided with a first feed water pump 39.

One end of a low-pressure feed water heater drain pipe 41 is connected to the low-pressure feed water heater 31, while the other end of the low-pressure feed water heater drain pipe 41 is connected to the deaerator inlet pipe 36. The low-pressure feed water heater drain pipe 41 is provided with a drain pump 42. One end of a high-pressure feed water heater drain pipe 43 is connected to the high-pressure feed water heater 33, while the other end of the high-pressure feed water heater drain pipe 43 is connected to the deaerator 32. A low-pressure feed water heater extraction pipe 45 for supplying extraction steam from the outlet of the intermediate-pressure steam turbine 22 to the low-pressure feed water heater 31 is connected to the low-pressure feed water heater 31. A deaerator extraction pipe 46 for supplying extraction steam from the outlet of the high-pressure steam turbine 21 to the decorator 32 is connected to the deaerator 32. A high-pressure feed water heater extraction pipe 47 for supplying extraction steam from a part in the middle of the high-pressure steam turbine 21 to the high-pressure feed water heater 33 is connected to the high-pressure feed water heater 33.

The solar heat storage/release system 3 includes a high-temperature tank 50 for containing the molten salt (heat storage medium) after storing solar heat and a low-temperature tank 51 for containing the molten salt before the heat storage (after release of the heat). The solar heat storage/release system 3 further includes a heat storage heater 52 for exchanging heat between part of the superheated steam (heat medium) generated by the solar heat collection system 1 and the molten salt supplied from the low-temperature tank 51, a preheater 53 for exchanging heat between water (heat medium) in the secondary power generation system 1 and the molten salt from an evaporator 54 which will be explained later, and the evaporator 54 for performing heat exchange between feed water from the preheater 53 and the molten salt supplied from the high-temperature tank 50. Heat exchangers of the tube type or other types can be cited as examples of the heat storage heater 52, the preheater 53 and the evaporator 54.

A heat storage heater inlet pipe 56 is connected to the outlet of the low-temperature tank 51 and to the inlet of the heat storage heater 52. A high-temperature tank inlet pipe 57 is connected to the outlet of the heat storage heater 52 and to the inlet of the high-temperature tank 50. An evaporator inlet pipe 58 is connected to the outlet of the high-temperature tank 50 and to the inlet of the evaporator 54. A preheater inlet pipe 59 is connected to the outlet of the evaporator 54 and to the inlet of the preheater 53. A low-temperature tank inlet pipe 60 is connected to the outlet of the preheater 53 and to the inlet of the low-temperature tank 51. The heat storage heater inlet pipe 56 is provided with a low-temperature tank outlet valve 62 and a first molten salt pump 63 on the downstream side of the low-temperature tank outlet valve 62. The high-temperature tank inlet pipe 57 is provided with a high-temperature tank inlet valve 64. The evaporator inlet pipe 58 is provided with a high-temperature tank outlet valve 65 and a second molten salt pump 66 on the downstream side of the high-temperature tank outlet valve 65. The low-temperature tank inlet pipe 60 is provided with a low-temperature tank inlet valve 67.

The secondary power generation system 4 includes a saturated steam turbine 70 rotationally driven by the saturated steam and a secondary generator 71 driven by the saturated steam turbine 70. The saturated steam turbine 70 is provided with various moisture separation mechanisms for suppressing erosion by moisture generated during the operation in a moist region. For rotor blades, for example, moisture separation blades with separation grooves are employed. Further, a stationary member arranged on the outer peripheral side of the rotor blades is provided with a moisture separation chamber for discharging the moisture separated by the grooves of the moisture separation blades to the outside of the turbine.

Into the saturated steam turbine 70, the saturated steam is introduced via the second main steam pine 72 branching from the solar heat superheater outlet pipe 14 of the solar heat collection system 1 and a saturated steam pipe 73. The downstream end of the second main steam pipe 72 is connected to the inlet of the heat storage heater 52 of the solar heat storage/release system 3. The upstream end of the saturated steam pipe 73 is connected to the outlet of the heat storage heater 52. The second main steam pipe 72 is provided with the second steam flow control valve 74 and a heat storage heater steam stop valve 75 on the downstream side of the second steam flow control valve 74. The second steam flow control valve 74 controls the flow rate ratio of the superheated steam flowing from the solar heat superheater outlet pipe 14 of the solar heat collection system 1 to the first main steam pipe 26 and the second main steam pipe 72 in cooperation with the first steam flow control valve 27 of the main power generation system 2. The heat storage heater steam stop valve 75 is a valve for opening and closing the second main steam pipe 72. The saturated steam pipe 73 is provided with a saturated steam regulating valve 76.

The secondary power generation system 4 further includes a circulation system for supplying the heat medium (water/steam) after driving the saturated steam turbine 70 to the preheater 53 and the evaporator 54 of the solar heat storage/release system 3 and resupplying the saturated steam generated by heat exchange with heat storage medium of the solar heat storage/release system 3 to the saturated steam turbine 70. The circulation system includes a second air-cooled steam condenser 78 that cools down exhaust steam from the saturated steam turbine 70 with air and thereby returns the exhaust steam to the condensed water, a second condensate pipe 79 that is connected to the second air-cooled steam condenser 78, a preheater feed water pipe 80 that is connected to the second condensate pipe 79 and the inlet of the preheater 53 of the solar heat storage/release system 3, an evaporator feed water pipe 81 that is connected to the outlet of the preheater 53 and to the inlet of the evaporator 54 of the solar heat storage/release system 3, and an evaporator outlet pipe 82 that is connected to the outlet of the evaporator 54 and to a portion of the saturated steam pipe 73 on the upstream side of the saturated steam regulating valve 76. The second condensate pipe 79 is provided, with a second condensate pump 83. The preheater feed water pipe 80 is provided with a second feed water pump 84 and a preheater feed water control valve 85 on the downstream side of the second feed water pump 84. The preheater feed water control valve 85 controls the amount of feed water to be supplied to the preheater 53. The evaporator outlet pipe 82 is provided with a saturated steam stop valve 86 for opening and closing the evaporator outlet pipe 82.

A feed water three-way switching valve 88 is disposed in the second condensate pipe 79 of the circulation system on the downstream side of the second condensate pump 83. One end of the condensate confluence pipe 89 is connected to the feed water three-way switching valve 88, while the other end of the condensate confluence pipe 89 is connected to a portion of the first condensate pipe 35 of the condensate feed water system of the main power generation system 2 on the upstream side of the first condensate pump 38. The feed water three-way switching valve 88 is a valve for switching the supply line of the condensed water (heat medium) from the second air-cooled steam condenser 78 between the condensate confluence pipe 89 and the preheater feed water pipe 80. In other words, the feed water three-way switching valve 88 is a valve that supplies the condensed water of the secondary power generation system 4 to either one selected from the condensate feed water system of the main power generation system 2 and the preheater 53 of the solar heat storage/release system 3 (the circulation system of the secondary power generation system 4).

The secondary power generation system 4 further includes a bypass system for allowing part of the saturated steam from the heat storage heater 52 of the solar heat storage/release system 3 to bypass the saturated steam turbine 70. The bypass system includes a bypass pipe 91 branching from a portion of the saturated steam pipe 73 on the upstream side of the saturated steam regulating valve 76, a saturated steam attemperator 92 for reducing the temperature of the saturated steam from the bypass pipe 91, and an attemperator outlet pipe 93 connected to the saturated steam attemperator 92 and to the second air-cooled steam condenser 78. An attemperation water pipe 94 is connected to the saturated steam attemperator 92. To the attemperation water pipe 94, a feed water branch pipe 95 branching from the downstream side of the first feed water pump 39 in the feed water pipe 37 of the main power generation system 2 is connected. To the saturated steam attemperator 92, the feed water from the main power generation system 2 is supplied via the attemperation water pipe 94 and the feed water branch pipe 95 as attemperation water for reducing the temperature of the saturated steam. The bypass pipe 91 is provided with a bypass pressure-reducing valve 97 for controlling the flow rate of the saturated steam to bypass the saturated steam turbine 70. The attemperation water pipe 94 is provided with a bypass attemperation valve 98 for regulating the flow rate of the attemperation water to be supplied to the saturated steam attemperator 92.

Next, the solar thermal power generation method employed in the solar thermal power generation system according to the embodiment of the present invention will be described below with reference to FIGS. 1 and 2.

First, a method for performing the power generation and the heat storage by collecting solar heat in the daytime will be described.

Overall, the solar heat collection system 1 heats up the feed water (heat medium) supplied from the condensate feed water system of the main power generation system 2 by the collected solar heat, thereby generating the superheated steam (heat medium). The superheated steam generated by the solar heat collection system 1 is divided, part of the superheated steam is supplied to the main power generation system 2, and the rest of the superheated steam is supplied to the solar heat storage/release system 3 and the secondary power generation system 4. The main power generation system 2 performs the power generation with the main generator 24 by driving the steam turbine 21, 22 and 23 with the superheated steam supplied from the solar heat collection system 1. The condensed water (heat medium) generated by the driving of the steam turbine 21, 22 and 23 is supplied again to the solar heat collection system 1 from the condensate feed water system and the heat medium is circulated in the solar heat collection system 1 and the main power generation system 2. The solar heat storage/release system 3 recovers sensible heat of the superheated steam into the molten salt (heat storage medium) by heat exchange between the superheated steam supplied from the solar heat collection system 1 and low-temperature molten salt, thereby storing the solar heat in the molten salt. The secondary power generation system 4 performs the power generation with the secondary generator 71 by driving the saturated steam turbine 70 with the solar heat not recovered into the molten salt of the solar heat storage/release system 3, that is, with the energy of the saturated steam (heat medium). The condensed water (heat medium) generated by the driving of the saturated steam turbine 70 is supplied to the condensate feed water system of the main power generation system 2 and the heat medium is circulated in the solar heat collection system 1 and the secondary power generation system 4.

As above, in the solar thermal power generation system, the sensible heat of the superheated steam generated by the solar heat is stored in the molten salt of the solar heat storage/release system 3 and latent heat of the saturated steam generated from the superheated steam by heat exchange with the molten salt drives the saturated steam turbine 70 of the secondary power generation system 4, thereby generating electric power. Therefore, the efficient use of the solar heat is achieved.

Specifically, in FIGS. 1 and 2, the feed water stop valve 15 and the main steam stop valve 16 of the solar heat collection system 1 are opened, by which the solar heat collection system 1 is enabled to operate. Further, the heat storage heater steam stop valve 75 of the secondary power generation system 4 is opened and the feed water three-way switching valve 88 is switched to the side of the condensate feed water system of the main power generation system 2. Accordingly, the secondary power generation system 4 forms one heat medium cycle together with the solar heat collection system 1 and the condensate feed water system of the main power generation system 2. The saturated steam stop valve 86 and the bypass pressure-reducing valve 97 of the secondary power generation system 4 are closed, by which the circulation system and the bypass system of the secondary power generation system 4 are set in a stopped state. Further, the low-temperature tank outlet valve 62 and the high-temperature tank inlet valve 64 of the solar heat storage/release system 3 are opened and the high-temperature tank outlet valve 65 and the low-temperature tank inlet valve 67 are closed, by which the flow of the heat storage medium in the solar heat storage/release system 3 is switched to that for the heat storage.

To the solar heat evaporator (solar heat collector) 10 of the solar heat collection system 1 shown in FIG. 1, high-pressure feed water (heat medium) from the condensate feed water system of the main power generation system 2 is supplied via the solar heat evaporator feed water pipe 12. This high-pressure feed water is heated up by the thermal energy from the sun S while flowing through the solar heat evaporator 10 and turns into saturated steam (heat medium). The saturated steam from the solar heat evaporator 10 flows downstream to the steam separator 17 and is separated into saturated water and saturated steam. The saturated water separated by the steam separator 17 is pressurized, by the circulation pump 19, merges with the high-pressure feed water from the feed water system of the main power generation system 2, and returns again to the solar heat evaporator 10.

Meanwhile, the saturated steam separated by the steam separator 17 is supplied to the solar heat superheater 11 via the solar heat superheater steam pipe 13. This saturated steam is heated up by the thermal energy from the sun S while flowing through the solar heat superheater 11 and turns into high-temperature and high-pressure superheated steam (heat medium). The high-temperature and high-pressure superheated steam is commonly referred to as main steam. The main steam is branched from the solar heat superheater outlet pipe 14 into the first main steam pipe 26 and the second main steam pipe 72. The main steam flow rate ratio between the first main steam pipe 26 and the second main steam pipe 72 is controlled by adjusting the valve opening degrees of the first steam flow control valve 27 and the second steam flow control valve 74 in relation to each other.

Out of the superheated steam (heat medium) generated in the solar heat collection system 1, the superheated steam supplied to the main power generation system 2 via the first main steam pipe 26 is introduced successively into the high-pressure steam turbine 21, the intermediate-pressure steam turbine 22 and the low-pressure steam turbine 23 through the main steam regulating valve 28 and drives these steam turbines 21, 22 and 23. By the rotary driving of the steam turbine 21, 22 and 23, the main generator 24 is driven and performs the power generation. The steam (heat medium) discharged from the low-pressure steam turbine 23 flows into the first air-cooled steam condenser 30, is cooled down in the first air-cooled steam condenser 30 with air taken in through an air intake, and returns to condensed water (heat medium). The air after cooling down the steam in the first air-cooled steam condenser 30 is discharged to the atmosphere through an air outlet.

The condensed water generated in the first air-cooled steam condenser 30 is supplied to the low-pressure feed water heater 31 by the first condensate pump 38 via the first condensate pipe 35. In the low-pressure feed water heater 31, the condensed water is heated up by extraction steam supplied from the outlet of the intermediate-pressure steam turbine 22 via the low-pressure feed water heater extraction pipe 45. The condensed water heated by the low-pressure feed water heater 31 is supplied to the deaerator 32 via the deaerator inlet pipe 36. In the deaerator 32, the condensed water is heated up and deaerated by extraction steam supplied from the outlet of the high-pressure steam turbine 21 via the deaerator extraction pipe 46. Feed-water (heat medium) obtained by the deaeration in the deaerator 32 is pressurized by the first feed water pump 39 and supplied to the high-pressure feed water heater 33 via the feed water pipe 37. In the high-pressure feed water heater 33, the feed water (heat medium) is heated up by extraction steam supplied from the part in the middle of the high-pressure steam turbine 21 via the high-pressure feed water heater extraction pipe 47. The feed water that has reached high temperature and high pressure by the heating in the high-pressure feed water heater 33 is supplied again to the solar heat evaporator 10 of the solar heat collection system 1 via the solar heat evaporator feed water pipe 12.

Incidentally, drain generated during the heating of the condensed water by the low-pressure feed water heater 31 is pressurized by the drain pump 42, merged with the condensed water in the deaerator inlet pipe 36 via the low-pressure feed water heater drain pipe 41, and supplied to the deaerator 32. Meanwhile, drain generated during the heating of the condensed water by the high-pressure feed water heater 33 is returned to the deaerator 32 via the high-pressure feed water heater drain pipe 43.

On the other hand, out of the superheated steam generated in the solar heat collection system 1, the superheated steam supplied via the second main steam pipe 72 is introduced into the heat storage heater 52 of the solar heat storage/release system 3 as shown in FIG. 2. In this case, the low-temperature molten salt (heat storage medium) contained in the low-temperature tank 51 is pressurized by the first molten salt pump 63, supplied to the heat storage heater 52 via the heat storage heater inlet, pipe 56. In the heat storage heater 52, the low-temperature molten salt is heated up by heat exchange with the superheated steam. The molten salt heated to high temperature by the heat storage heater 52 is contained in the high-temperature tank 50 via the high-temperature tank inlet pipe 57. To sum up, in the solar heat storage/release system 3, the sensible heat of the superheated steam over the solidification temperature of the molten salt (approximately 250° C.) generated by the solar heat is stored (recovered) in the molten salt, and the molten salt after the heat storage is contained in the high-temperature tank 50.

The superheated steam that has exchanged heat with the low-temperature molten salt in the heat storage heater 52 drops in temperature and turns into saturated steam (heat medium). The saturated steam from the heat storage heater 52 flows through the saturated steam regulating valve 76, is introduced into the saturated steam turbine 70 via the saturated steam pipe 73, and rotationally drives the saturated steam turbine 70. By the rotary driving of the saturated steam turbine 70, the secondary generator 71 is driven and performs the power generation. To sum up, in the secondary power generation system 4, the latent heat of the saturated steam in the vicinity of the solidification temperature of the molten salt, where the heat storage by the molten salt is difficult, is used for the power generation by the saturated steam turbine 70.

The steam (heat medium) discharged from the saturated steam turbine 70 flows into the second air-cooled steam condenser 78, in which the steam is air-cooled and returns to condensed water (heat medium) in the same way as in the first air-cooled steam condenser 30. Since the feed water three-way switching valve 88 has been switched to the side of the condensate feed water system of the main power generation system 2, the condensed water generated in the second air-cooled steam condenser 78 is merged with the condensed water flowing in the first condensate pipe 35 of the main power generation system 2 shown in FIG. 1 by the second condensate pump 83 via the second condensate pipe 79 and the condensate confluence pipe 89, and is supplied to the low-pressure feed water heater 31. The merged condensed water is supplied again to the solar heat collection system 1 from the condensate feed water system of the main power generation system 2.

As above, in this embodiment, one cycle of a heat medium (water/steam) is formed by the solar heat collection system 1 and the main power generation system 2 without separately forming heat medium cycles of the solar heat collection system 1 and the main power generation system 2. Accordingly, simplification of the heat medium cycle can be achieved.

Further, in this embodiment, one cycle of a heat medium (water/steam) is formed by the solar heat collection system 1, the secondary power generation system 4 and the condensate feed water system of the main power generation system 2 without separately forming heat medium cycles of the solar heat collection system 1 and the secondary power generation system 4. Accordingly, simplification of the heat medium cycle can be achieved.

Furthermore, in the solar heat storage/release system 3, solar heat is stored in the molten salt by having the heat storage heater 52 perform the heat exchange between the superheated steam generated by the solar heat and the low-temperature molten salt. Therefore, simplification of the configuration can be achieved in comparison with the solar heat storage/release system that stores solar heat in heat storage media by using three heat exchangers depending on the state of the process ranging from superheated steam to subcooled water.

In addition, in the solar heat storage/release system 3, the heat storage medium before the heat storage is contained in the low-temperature tank 51 and the heat storage medium after the heat storage is contained in the high-temperature tank 50. Therefore, simplification of the configuration can be achieved in comparison with the solar heat storage/release system that contains the heat storage media by using at least three tanks, practically six tanks, depending on the state of the process ranging from superheated steam to subcooled water.

Further, the solar heat storage/release system 3 stores heat in the heat storage medium by heat exchange only with superheated steam over the solidification temperature of the molten salt without heat storage of the heat storage medium by heat exchange with saturated steam in the vicinity of the solidification temperature of the molten salt or by heat exchange with high-temperature water below the solidification temperature of the molten salt. Accordingly, using molten salt alone as the heat storage medium is possible.

Furthermore, in this embodiment, the saturated steam turbine 70 of the secondary power generation system 4 is driven and generates electric power with the thermal energy of saturated steam which is difficult to store in molten salt. Accordingly, the solar heat can be utilized efficiently.

Next, a power generation method by heat release from the molten salt (heat storage medium) of the solar heat storage/release system 3 in the nighttime or in the daytime with no insolation (e.g., rainy weather) will be described below.

Overall, the solar heat collection system 1 is incapable of generating steam in the nighttime or in the daytime with no insolation. Therefore, saturated steam (heat medium) is generated from the feed water by the heat release from the molten salt by heat exchange between the high-temperature molten salt (heat storage medium) of the solar heat storage/release system 3 after heat storage and the feed water (heat medium) of the secondary power generation system 4. The saturated steam turbine 70 of the secondary power generation system 4 is driven by the saturated steam and thus generates electric power. Feed-water generated by the driving of the saturated steam turbine 70 again exchanges heat with the molten salt of the solar heat storage/release system 3. As above, power generation is carried out using the saturated steam generated by heat exchange between the heat medium of the secondary power generation system 4 and the heat storage medium of the solar heat storage/release system 3.

Specifically, in FIGS. 1 and 2, the feed water stop valve 15 and the main steam stop valve 16 of the solar heat collection system 1 are closed, by which the solar heat collection system 1 is set in a stopped state. Further, the heat storage heater steam stop valve 75 of the secondary power generation system 4 is closed, the saturated steam stop valve 86 is opened, and the feed water three-way switching valve 88 is switched to the side of the preheater feed water pipe 80 of the secondary power generation system 4. Accordingly, the heat medium cycle of the secondary power generation system 4 is switched to the circulation system and the heat exchange in the heat storage heater 52 is set in a stopped state. The bypass pressure-reducing valve 97 of the secondary power generation system 4 is closed, by which the bypass system of the secondary power generation system 4 is set in a stopped state. Further, the high-temperature tank outlet valve 65 and the low-temperature tank inlet valve 67 of the solar heat storage/release system 3 are opened and the high-temperature tank inlet valve 64 and the low-temperature tank outlet valve 62 are closed, by which the flow of the heat storage medium in the solar heat storage/release system 3 is switched to that for the heat release.

The feed water (heat medium) of the secondary power generation system 4 shown in FIG. 2 is pressurized by the second feed water pump 84 and is supplied to the preheater 53 via the preheater feed water pipe 80. The amount of the feed water to be supplied to the preheater 53 is controlled by the preheater feed water control valve 85. The feed water supplied to the preheater 53 is heated up by the heat exchange with the molten salt (heat storage medium) of the solar heat storage/release system 3 supplied from the evaporator 54 to the preheater 53. The feed water heated by the preheater 53 is supplied to the evaporator 54 on the downstream side via the evaporator feed water pipe 81. In the evaporator 54, the heated feed water is turned into saturated steam by heat exchange with the high-temperature molten salt that is introduced from the high-temperature tank 50 into the evaporator 54 and has stored the solar heat. The saturated steam generated in the evaporator 54 is introduced into the saturated steam turbine 70 via the evaporator outlet pipe 82 and the saturated steam pipe 73 and rotationally drives the saturated steam turbine 70. By the rotary driving of the saturated steam turbine 70, the secondary generator 71 is driven and performs the power generation.

The steam (heat medium) discharged from the saturated steam turbine 70 flows into the second air-cooled steam condenser 78, in which the steam is air-cooled and returns to condensed water (heat medium). Since the feed water three-way switching valve 88 has been switched to the side of the preheater feed water pipe 80 of the secondary power generation system 4, the condensed water generated in the second air-cooled steam condenser 78 flows into the preheater feed water pipe 80 via the second condensate pipe 79 by the second condensate pump 83. The condensed water (feed water) is supplied again to the preheater 53 and flows in the circulation system of the secondary power generation system 4.

Meanwhile, the high-temperature molten salt that is contained in the high-temperature tank 50 of the solar heat storage/release system 3 and has stored the solar heat is pressurized by the second molten salt pump 66 and supplied to the evaporator 54 via the evaporator inlet pipe 58. The evaporator 54 exchanges heat between the molten salt and the feed water of the secondary power generation system 4 flowing in from the preheater 53, and thus saturated steam is generated from the feed water by the heat release from the molten salt. The molten salt after releasing heat and dropping in temperature is supplied to the preheater 53 via the preheater inlet pipe 59. The preheater 53 exchanges heat between the feed water and the molten salt, and thus the feed water is preheated by the heat release from the molten salt. The molten salt after releasing heat and further dropping in temperature in the preheater 53 is contained in the low-temperature tank 51 via the low-temperature tank inlet pipe 60.

As above, in this embodiment, the heat exchange between the molten salt (heat storage medium) of the solar heat storage/release system 3 after heat storage and the feed water (heat medium) of the secondary power generation system 4 is performed in the preheater 53 and an the evaporator 54, and power generation is carried out by using the saturated steam generated by the heat release from the molten salt. Therefore, simplification of the configuration can be achieved in comparison with solar thermal power generation systems that use three heat exchangers to implement the heat release from the heat storage media and generate superheated steam from the feed water to carry out power generation.

Further, in this embodiment, the steam generated by the heat release from the molten salt is not superheated steam but saturated steam. Thus, the final heat release temperature of the molten salt (temperature at the outlet of the preheater 53) can be set high compared to the cases where superheated steam is generated. In other words, the final heat release temperature of the molten salt can consistently be maintained higher than the solidification temperature of the molten salt.

Figure 3:
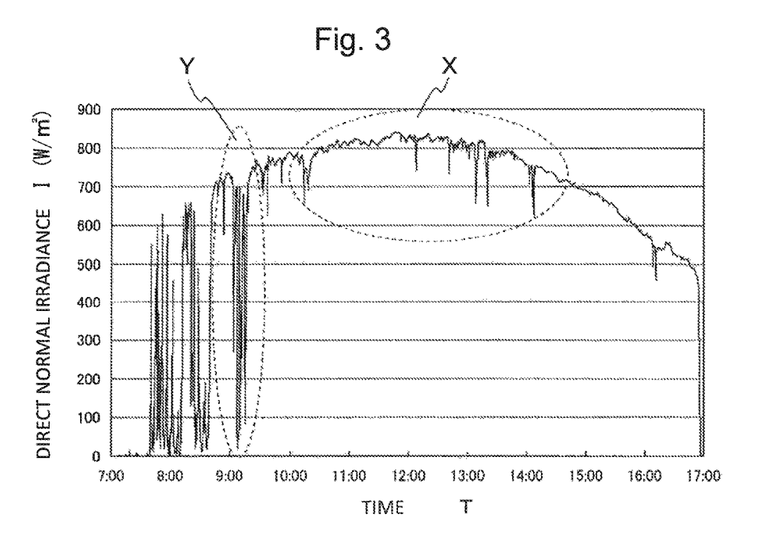
FIG. 3 is a diagram showing an example of actual measurements of direct normal irradiance (DNI) at a certain place.

Incidentally, in solar heat collectors of the Fresnel type or the tower type employed as the solar heat evaporator 10 and the solar heat superheater 11 of the solar heat collection system 1 shown in FIG. 1, the amount of generated steam fluctuates depending on the magnitude of DNI. Sharp fluctuations in the amount of generated steam can lead to sudden rises drops in the steam temperature at the inlet of the steam turbine, which might affect the operating life of the steam turbine and impair the reliability of the steam turbine. Thus, there arises the need of regulating the power generation output and the amount of heat storage according to the amount of generated steam which fluctuates depending on the magnitude of the DNI. The DNI in the daytime can fluctuate in various ways, such as fluctuating slightly (e.g., the region indicated by the reference character X in FIG. 3) and dropping significantly due to a sudden loss of insolation like passage of a large mass of cloud over the solar heat collector (e.g., the region indicated by the reference character Y in FIG. 3). FIG. 3 is a diagram showing an example of actual measurements of the DNI at a certain place. In FIG. 3, the vertical axis I represents the DNI and the horizontal axis T represents the time.

Therefore, solar thermal power generation methods employed when the DNI in the daytime fluctuates in the solar thermal power generation system according to the embodiment of the present invention will be described below.

First, a power generation method employed when the DNI fluctuates within a small range will be described by referring to FIGS. 1, 2, 4 and 5.

Figure 4:
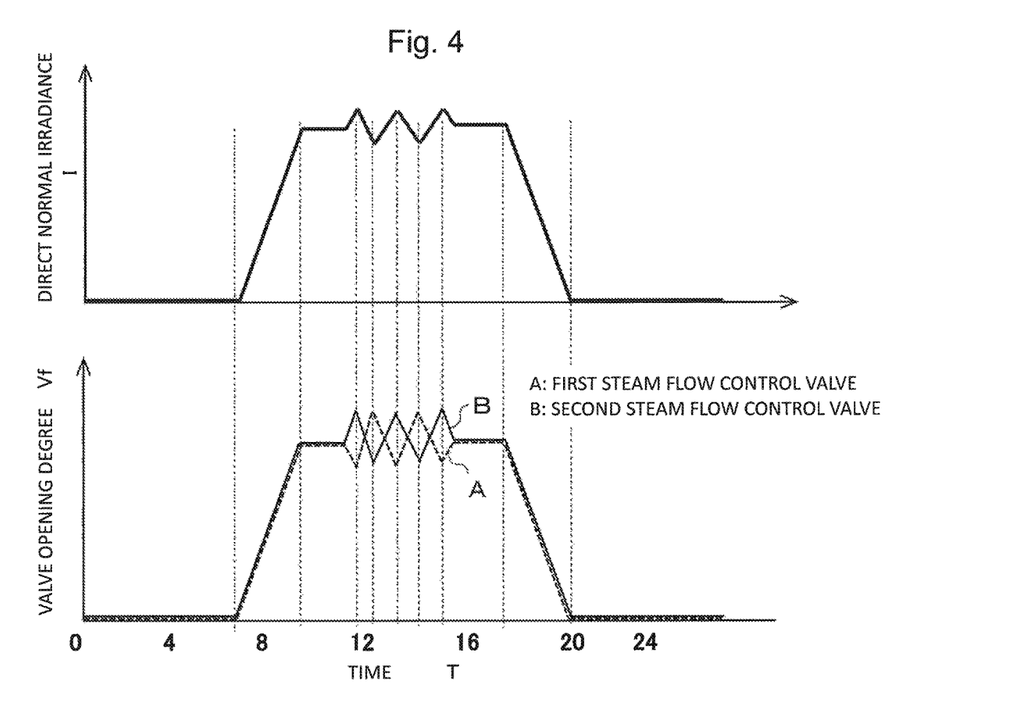
FIG. 4 is a characteristic diagram showing transition of valve opening degrees of a first steam flow control valve and a second steam flow control valve in response to slight fluctuations of the DNI in the solar thermal power generation system and the solar thermal power generation method according to the embodiment of the present invention.
Figure 5:
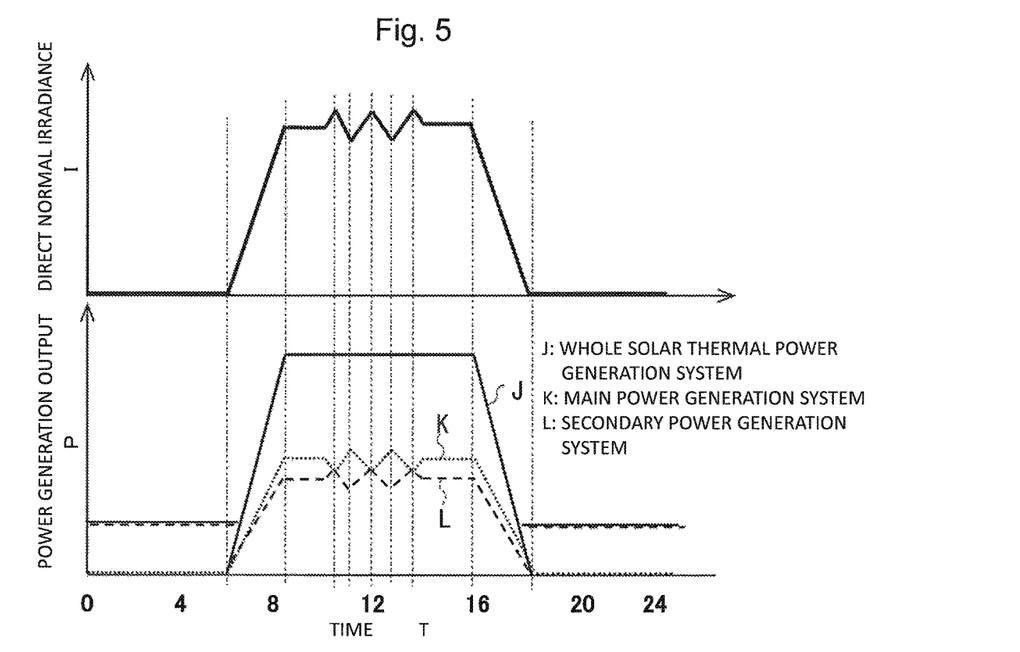
FIG. 5 is a characteristic diagram showing transition of power generation outputs of various systems in response to the slight fluctuations of the DNI in the solar thermal power generation system and the solar thermal power generation method according to the embodiment of the present invention.

FIG. 4 is a characteristic diagram showing transition of the valve opening degrees of the first steam flow control valve and the second steam flow control valve in response to the slight fluctuations of the DNI in the solar thermal power generation system and the solar thermal power generation method according to the embodiment of the present invention. FIG. 5 is a characteristic diagram showing transition of the power generation outputs of various systems in response to the slight fluctuations of the DNI in the solar thermal power generation system and the solar thermal power generation method according to the embodiment of the present invention. In the upper part of FIG. 4, the vertical axis I represents the DNI and the horizontal axis T represents the time. In the lower part of FIG. 4, the vertical axis Vf represents the valve opening degrees of the first steam flow control valve 27 and the second steam flow control valve 74 and the horizontal axis T represents the time. In the lower part, the dotted lines A indicate the valve opening degree of the first steam flow control valve 27 and the solid lines F indicate the valve opening degree of the second steam flow control valve 74. In the upper part of FIG. 5, the vertical axis I represents the DNI and the horizontal axis T represents the time. In the lower part of FIG. 5, the vertical axis P represents the power generation outputs of various systems and the horizontal axis T represents the time. In the lower part, the solid lines J indicate the power generation output of the whole solar thermal power generation system, the dotted lines K indicate the power generation output of the main power generation system 2, and the broken lines L indicate the power generation output of the secondary power generation system 4. Reference characters in FIGS. 4 and 5 identical with those shown in FIGS. 1-3 represent the same parts as those in FIGS. 1-3, and thus detailed explanation thereof is omitted here.

When the DNI in a substantially constant and stable state has started fluctuating within a small range (e.g., around 12:00-16:00 in the upper parts of FIGS. 4 and 5), by adjusting the valve opening degrees of the first steam flow control valve 27 and the second steam flow control valve 74 in relation to each other as shown in the lower part of FIG. 4, system operation maintaining the power generation output of the solar thermal power generation system at a substantially constant level is possible as shown in the lower part of FIG. 5.

Specifically, when the DNI in a substantially constant and stable state has increased slightly as shown in the upper part of FIG. 4, by decreasing the valve opening degree of the first steam flow control valve 27 shown in FIG. 1 corresponding to the slight increase in the DNI, the amount of steam introduced from the solar heat collection system 1 into the steam turbine 21, 22 and 23 of the main power generation system 2 decreases and thus the power generation output by the steam turbine 21, 22 and 23 decreases. On the other hand, by increasing the valve opening degree of the second steam flow control valve 74 corresponding to the slight increase in the DNI, the amount of steam supplied from the solar heat collection system 1 to the heat storage heater 52 of the solar heat storage/release system 3 shown in FIG. 2 increases and the increment in the solar heat due to the increase in the DNI can be further stored in the molten salt. In this case, the amount of the saturated steam generated by the heat storage heater 52 also increases due to the increase in the amount of the superheated steam supplied to the heat storage heater 52. Accordingly, the amount of the saturated steam introduced into the saturated steam turbine 70 of the secondary power generation system 4 also increases and the power generation output by the saturated steam turbine 70 increases. By making the adjustment such that the increase in the power generation output by the saturated steam turbine 70 and the decrease in the power generation output by the steam turbine 21, 22 and 23 substantially coincide with each other, the power generation output of the whole solar thermal power generation system (sum total of the power generation output by the steam turbine 21, 22 and 23 and the power generation output by the saturated steam turbine 70) can be maintained at a substantially constant level.

Conversely, when the DNI has shifted from the slight increase to a slight decrease as shown in the upper part of FIG. 4, by increasing the valve opening degree of the first steam flow control valve 27 shown in FIG. 1 corresponding to the slight decrease in the DNI, the amount of steam introduced into the steam turbine 21, 22 and 23 increases and thus the power generation output by the steam turbine 21, 22 and 23 increases. On the other hand, by decreasing the valve opening degree of the second steam flow control valve 74 corresponding to the slight decrease in the DNI, the amount of steam supplied to the heat storage heater 52 shown in FIG. 2 decreases and the amount of heat storage by the molten salt is decreased by the decrement in the solar heat due to the decrease in the DNI. In this case, the amount of the saturated steam generated by the heat storage heater 52 also decreases due to the decrease in the amount of the superheated steam supplied to the heat storage heater 52. Accordingly, the amount of the saturated steam introduced into the saturated steam turbine 70 also decreases and the power generation output by the saturated steam turbine 70 decreases. By making the adjustment such that the decrease in the power generation output by the saturated steam turbine 70 and the increase in the power generation output by the steam turbine 21, 22 and 23 substantially coincide with each other, the power generation output of the whole solar thermal power generation system can be maintained at a substantially constant level.

As above, in this embodiment, the amount of heat storage by the molten salt in the solar heat storage/release system 3 can be increased and decreased by adjusting the valve opening degrees of the first steam flow control valve 27 and the second steam flow control valve 74 in relation to each other according to slight increase/decrease in the DNI. Accordingly, the power generation output of the whole solar thermal power generation system can be maintained at a substantially constant level.

Incidentally, in the example shown in FIG. 4, the valve opening degrees of the first steam flow control valve 27 and the second steam flow control valve 74 are adjusted to be substantially equal to each other when the main power generation system 2 is started up or stopped and when the DNI is substantially constant. In other words, the flow rate ratio of the superheated steam flowing from the solar heat collection system 1 into the steam turbine 21, 22 and 23 and the heat storage heater 52 is set at 1:1.

Next, a power generation method employed when the DNI sharply fluctuates upward for a short time will be described by referring to FIGS. 1, 2 and 6.

Figure 6:
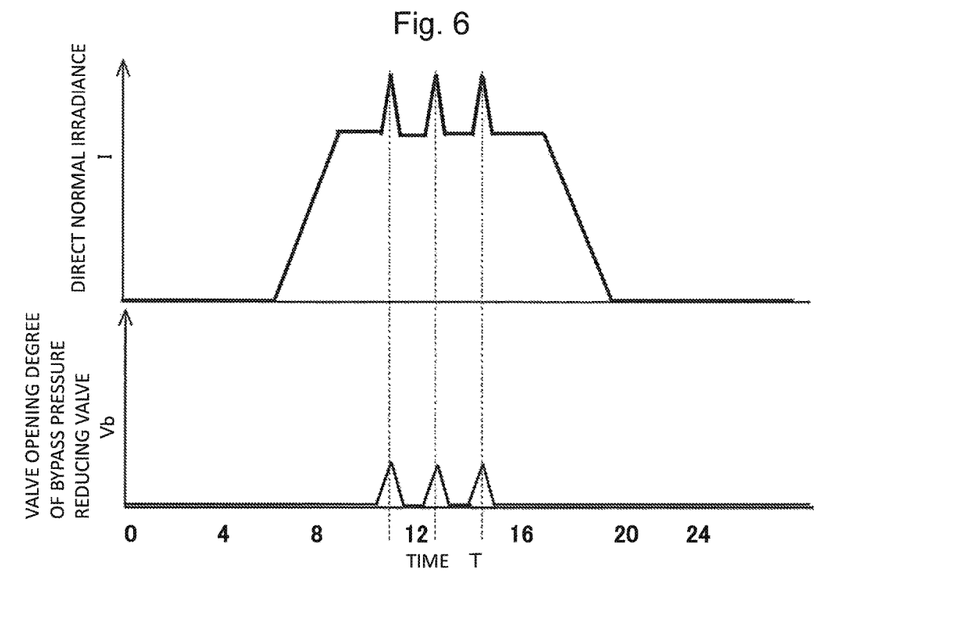
FIG. 6 is a characteristic diagram showing transition of the valve opening degree of a bypass pressure-reducing valve in response to sharp upward fluctuations of the DNI in a short time in the solar thermal power generation system and the solar thermal power generation method according to the embodiment of the present invention.

FIG. 6 is a characteristic diagram showing transition of the valve opening degree of the bypass pressure-reducing valve in response to sharp upward fluctuations of the DNI in a short time in the solar thermal power generation system and the solar thermal power generation method according to the embodiment of the present invention. In the upper part of FIG. 6, the vertical axis I represents the DNI and the horizontal axis T represents the time. In the lower part of FIG. 6, the vertical axis Vb represents the valve opening degree of the bypass pressure-reducing valve 97 and the horizontal axis T represents the time. Reference characters in FIG. 6 identical with those shown in FIGS. 1-5 represent the same parts as those in FIGS. 1-5, and thus detailed explanation thereof is omitted here.

When the DNI sharply increases for a short time like several to ten-odd minutes as shown in the upper part of FIG.

6, even if it is attempted to regulate the power generation output by adjusting the valve opening degrees of the first steam flow control valve 27 and the second steam flow control valve 74 as in the aforementioned power generation method for a slight increase in the DNI, the changing of the flow rate ratio of the superheated steam flowing into the steam turbine 21, 22 and 23 and the heat storage heater 52 may not follow the sharp increase in the DNI and thus the power generation output of the solar thermal power generation system may not be maintained at a substantially constant level. Therefore, the bypass system of the secondary power generation system 4 is activated so that part of the saturated steam bypasses the saturated steam turbine 70. Accordingly, the power generation output by the saturated steam turbine 70 decreases and the power generation output of the solar thermal power generation system is maintained at a substantially constant level.

Specifically, the valve opening degree of the bypass pressure-reducing valve 97 shown in FIG. 2 is increased corresponding to the degree of the sharp increase in the DNI (see FIG. 6). Accordingly, part of the saturated steam from the heat storage heater 52 flowing in the saturated steam pipe 73 is decompressed by the bypass pressure-reducing valve 97 and then flows into the saturated steam attemperator 92 via the bypass pipe 91. The saturated steam flowing into the saturated steam attemperator 92 is reduced in temperature by the attemperation water, and then flows into the second air-cooled steam condenser 78 via the attemperator outlet pipe 93. In the second air-cooled steam condenser 78, the saturated steam gets cooled down, and turns into condensed water. The attemperation water of the saturated steam attemperator 92 is the feed water extracted from the outlet side of the first feed water pump 39 of the main power generation system 2 shown in FIG. 1 through the feed water branch pipe 95 and supplied via the attemperation water pipe 94 by opening the bypass attemperation valve 98.

As above, in this embodiment, when the bypass pressure-reducing valve 97 is partially opened, part of the saturated steam from the heat storage heater 52 immediately flows into the second air-cooled steam condenser 78 via the bypass pipe 91 and the attemperator outlet pipe 93 and bypasses the saturated steam turbine 70. Thus, even in cases of sharp upward fluctuations of the DNI in a short time, the power generation output of the solar thermal power generation system can be maintained at a substantially constant level by decreasing the power generation output by the saturated steam turbine 70.

Next, a power generation method employed when the DNI decreases significantly will be described by referring to FIGS. 1, 2, 7 and 8.

Figure 7:
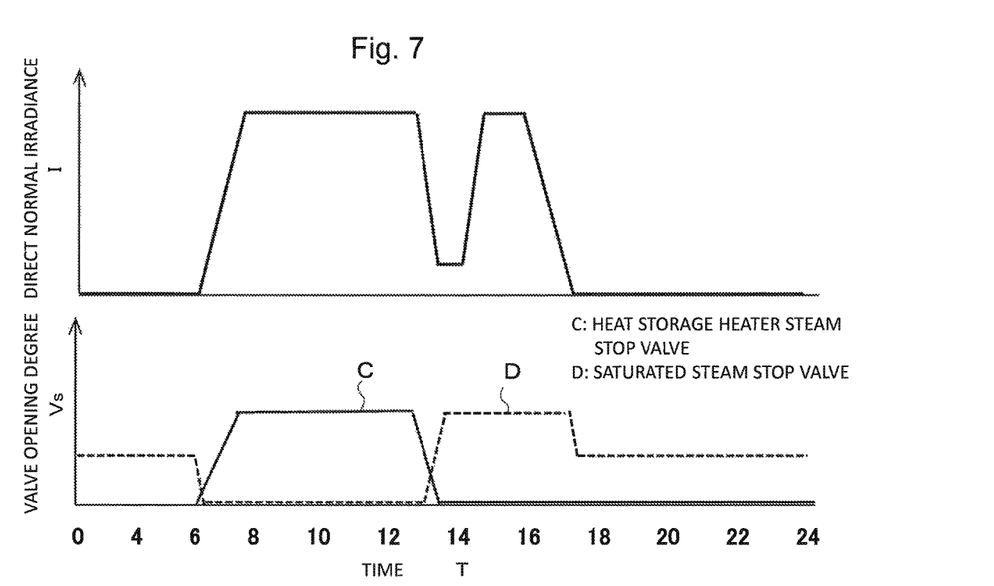
FIG. 7 is a characteristic diagram showing transition of the valve opening degrees of a heat storage heater steam stop valve and a saturated steam stop valve in response to a significant decrease in the DNI in the solar thermal power generation system and the solar thermal power generation method according to the embodiment of the present invention.
Figure 8:
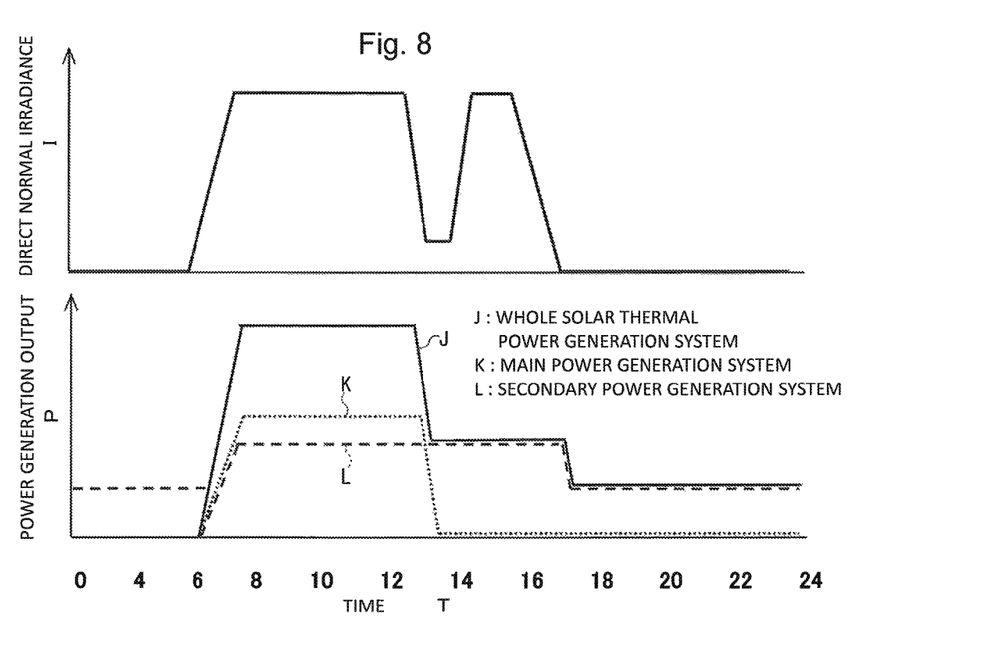
FIG. 8 is a characteristic diagram showing transition of the power generation outputs of various systems in response to the significant decrease in the DNI in the solar thermal power generation system and the solar thermal power generation method according to the embodiment of the present invention.

FIG. 7 is a characteristic diagram showing transition of the valve opening degrees of the heat storage heater steam stop valve and the saturated steam stop valve in response to a significant decrease in the DNI in the solar thermal power generation system and the solar thermal power generation method according to the embodiment of the present invention. FIG. 8 is a characteristic diagram showing transition of the power generation outputs of various systems in response to the significant decrease in the DNI in the solar thermal power generation system and the solar thermal power generation method according to the embodiment of the present invention. In the upper part of FIG. 7, the vertical axis I represents the DNI and the horizontal axis T represents the time. In the lower part of FIG. 7, the vertical axis Vs represents the valve opening degrees of the heat storage heater steam stop valve 75 and the saturated steam stop valve 86 and the horizontal axis T represents the time. In the lower part, the solid lines C indicate the valve opening degree of the heat storage heater steam stop valve 75 and the dotted lines D indicate the valve opening degree of the saturated steam stop valve 86. In the upper part of FIG. 8, the vertical axis I represents the DNI and the horizontal axis T represents the time. In the lower part of FIG. 8, the vertical axis P represents the power generation outputs of various systems and the horizontal axis T represents the time. In the lower part, the solid lines J indicate the power generation output of the whole solar thermal power generation system, the dotted lines K indicate the power generation output of the main power generation system 2, and the broken lines L indicate the power generation output of the secondary power generation system 4. Reference characters in FIGS. 7 and 8 identical with those shown in FIGS. 1-6 represent the same parts as those in FIGS. 1-6, and thus detailed explanation thereof is omitted here.

When the DNI decreases significantly in some hours, difficulty in collection of solar heat by the solar heat collection system 1 is expected. In other words, the amount of the superheated steam generated by the solar heat collection system 1 decreases significantly and consequently the power generation by the steam turbine 21, 22 and 23 of the main power generation system 2 and the saturated steam turbine 70 of the secondary power generation system 4 may not be maintained. Therefore, the saturated steam is generated by exchanging heat between the heat medium (feed water) of the secondary power generation system 4 and the heat storage medium (molten salt) of the solar heat storage/release system 3 and drives the saturated steam turbine 70 to generate electric power in the same way as in the nighttime. Thus, the solar thermal power generation system secures a certain level of power generation output thereof and prevents a significant drop in the power generation output.

In the stationary state (e.g., 8:00-12:00 in the upper parts of FIGS. 7 and 8) before the decrease in the DNI, the main power generation system 2 performs the power generation by using part of the superheated steam generated by the solar heat collection system 1 shown in FIG. 1 while the solar heat storage/release system 3 shown in FIG. 2 stores heat in the molten salt and the secondary power generation system 4 performs the power generation by using the rest of the superheated steam as explained above. In this case, as shown in the lower part of FIG. 7, the heat storage heater steam stop valve 75 of the secondary power generation system 4 is open for heat storage of the molten salt. On the other hand, the saturated steam stop valve 86 of the secondary power generation system 4 is closed in order to keep the power generation of the secondary power generation system 4 by heat release from the molten salt in the stopped state.

When a significant decrease in the DNI (e.g., 12:00-14:00 in the upper parts of FIGS. 7 and 8) occurs after such a state, the amount of the superheated steam generated by the solar heat collection system 1 shown in FIG. 1 decreases significantly. The power generation by the steam turbine 21, 22 and 23 of the main power generation system 2 is therefore stopped while the heat storage by the molten salt of the solar heat storage/release system 3 shown in FIG. 2 and the power generation by the secondary power generation system 4 is also stopped. To stop the heat exchange by the heat storage heater 52, the heat storage heater steam stab valve 75 is closed gradually as shown in the lower part of FIG. 7.

To secure a certain level of power generation output of the whole solar thermal power generation system, the secondary power generation system 4 carries out power generation by heat release from the molten salt. Specifically, the saturated steam stop valve 86 of the secondary power generation system 4 is opened as shown in the lower part of FIG. 7. The flow of the molten salt (heat storage medium) of the solar heat storage/release system 3 and the flow of the feed water (heat medium) of the secondary power generation system 4 at the time of the heat release from the molten salt are equivalent to those in the case of the power generation of the secondary power generation system 4 by the heat release from the molten salt in the nighttime. Even in cases of significant decrease in the DNI, the saturated steam turbine 70 is driven with the saturated steam generated by the heat release from the molten salt, and thereby generates electric power as shown in the lower part of FIG. 8. Consequently, a certain level of power generation output, of the whole solar thermal power generation system, such as a level corresponding to the power generation output of the saturated steam turbine 70 before the decrease in the DNI, can be secured and a significant drop in the power generation output can be prevented.

Incidentally, even when the DNI recovers from the significant decrease to the original state (e.g., 14:00-16:00 in the upper parts of FIGS. 7 and 8), the power generation of the secondary power generation system 4 by the heat release from the molten salt is maintained. This is because starting up and stopping the steam turbine 21, 22 and 23 of the main power generation system 2 a lot of times in response to significant fluctuations in the DNI can lead to deterioration in the reliability of the steam turbine 21, 22 and 23. The power generation of the secondary power generation system 4 by the heat release from the molten salt is continued also in the following night; however, the power generation output of the secondary power generation system 4 is decreased according to demanded power generation output in the nighttime.

As above, in this embodiment, when the DNI decreases significantly, the saturated steam turbine 70 can be driven with the saturated steam generated by the heat release from the molten salt after storing solar heat in the same way as in the nighttime. Thus, a certain level of power generation output of the whole solar thermal power generation system can be secured and a significant drop in the power generation output can be prevented.

As described above, according to this embodiment, the steam turbine 21, 22 and 23 is driven with part of the superheated steam generated by solar heat and thereby generates electric power. Further, by the heat exchange in the heat storage heater 52 between the rest of the superheated steam and the molten salt (heat storage medium) from the low-temperature tank 51, the sensible heat of the superheated steam is stored in the molten salt (heat storage medium) while saturated steam is generated from the superheated steam. The molten salt (heat storage medium) after the heat storage is contained in the high-temperature tank 50, and the saturated steam turbine 70 is driven with the saturated steam to generate electric power. Therefore, the solar heat storage/release system 3 is simplified and the construction costs can be reduced while the efficient use of the collected solar heat is also achieved.

Further, according to this embodiment, in cases where the solar heat cannot be collected, such as in the nighttime, heat exchange between the molten salt of the solar heat storage/release system 3 after solar heat storage and the feed water of the secondary power generation system 4 is performed in the preheater 53 and the evaporator 54, and the saturated steam turbine 70 is driver with the saturated steam generated from the feed water by the heat release from the molten salt to generate electric power. Therefore, the solar heat storage/release system 3 is simplified and the construction costs can be reduced while the efficient use of the collected solar heat is also achieved.

Other Embodiments

Incidentally, while an example employing a solar heat collector of the Fresnel type as the solar heat evaporator 10 and a solar heat collector of the tower type as the solar heat superheater 11 has been illustrated in the above-described embodiment, heat collectors of any type selected from the trough type, the Fresnel type and the tower type can be employed as the solar heat evaporator and the solar heat superheater of the solar heat collection system 1.

Further, while an example using a nitrate salt-based molten salt as the heat storage medium for the solar heat storage has been illustrated in the above-described embodiment, it is also possible to use synthetic oil having a lower melting point than the nitrate salt-based molten salt as the heat storage medium.

While an example using air-cooled steam condensers as the steam condensers for the steam turbine 21, 22 and 23 of the main power generation system 2 and the saturated steam turbine 70 of the secondary power generation system 4 has been illustrated in the above-described embodiment, it is also possible to use water-cooled steam condensers.

The present invention is not restricted to the embodiments described above but contains a variety of modifications. The above-described embodiments, which have been described in detail for clear and easy explanation of the present invention, are not necessarily limited to those including all the components described above.

What is claimed is:

1. A solar thermal power generation system comprising:
a solar heat collection system that uses water/steam as a heat medium, the solar heat collection system being configured to generate superheated steam from water by collecting solar heat;
a main power generation system that uses the heat medium in common with the solar heat collection system, the main power generation system being configured to perform power generation by using part of the superheated steam generated by the solar heat collection system;
a solar heat storage/release system that uses a heat storage medium different from the heat medium of the solar heat collection system, the solar heat storage/release system being configured to store heat in the heat storage medium by heat exchange with the rest of the superheated steam generated by the solar heat collection system and to release the heat stored in the heat storage medium; and
a secondary power generation system that uses the heat medium in common with the solar heat collection system, the secondary power generation system being configured to perform power generation by using the heat medium changed into saturated steam by heat storage or heat release of the heat storage medium in the solar heat storage/release system, wherein:
the main power generation system includes:
a steam turbine into which part of the heat medium from the solar heat collection system is introduced, the heat medium being superheated steam; and
a main generator driven by the steam turbine,
the solar heat storage/release system includes:
a heat storage heater for exchanging heat between the rest of the heat medium from the solar heat collection system and the heat storage medium to store heat in the heat storage medium and to change the heat medium from superheated steam into saturated steam;

a low-temperature tank for containing the heat storage medium to be supplied to the heat storage heater; and a high-temperature tank for containing the heat storage medium after storing heat in the heat storage heater, and the secondary power generation system includes:

a saturated steam turbine;

a secondary generator driven by the saturated steam turbine;

a first pipe connected to the solar heat collection system and to an inlet of the heat storage heater, the first pipe being configured to introduce the rest of the heat medium from the solar heat collection system into the heat storage heater, the heat medium being superheated steam; and a second pipe connected to an outlet of the heat storage heater and to an inlet of the saturated steam turbine, the second pipe being configured to introduce the heat medium from the first pipe through the heat storage heater into the saturated steam turbine.

2. The solar thermal power generation system according to claim 1, wherein:

the solar heat storage/release system further includes:

a preheater for exchanging heat between water in the secondary power generation system and the heat storage medium to heat up the water by heat release from the heat storage medium; and an evaporator for exchanging heat between the water heated by the preheater and the heat storage medium supplied from the high-temperature tank to generate saturated steam from the water by heat release from the heat storage medium, the low-temperature tank contains the heat storage medium from the preheater, and the saturated steam generated by the evaporator can be introduced into the saturated steam turbine.

3. The solar thermal power generation system according to claim 1, wherein:

the main power generation system further includes a first steam flow control valve, the secondary power generation system further includes a second steam flow control valve, and the first steam flow control valve and the second steam flow control valve control a ratio between a flow rate of the superheated steam to be supplied to the steam turbine and a flow rate of the superheated steam to be supplied to the heat storage heater.

4. The solar thermal power generation system according to claim 1, wherein the secondary power generation system further includes a bypass system for allowing part of the saturated steam to bypass the saturated steam turbine.

5. A solar thermal power generation method comprising:

changing a heat medium from water into superheated steam by collecting solar heat;

performing power generation by driving a steam turbine with part of the heat medium changed into superheated steam generated by the solar heat;

supplying a heat storage medium contained in a low-temperature tank to a heat storage heater;

introducing a remainder of the heat medium changed into superheated steam by the solar heat into the heat storage heater;

exchanging heat in the heat storage heater between the remainder of the heat medium changed into superheated steam by the solar heat and the heat storage medium supplied from the low-temperature tank to change the heat medium from superheated steam into saturated steam and to store the solar heat in the heat storage medium;

containing in a high-temperature tank the heat storage medium after heat storage in the heat storage heater;

introducing the heat medium changed into saturated steam from the superheated steam by the heat storage heater into a saturated steam turbine; and performing power generation by driving the saturated steam turbine with the heat medium through the heat storage heater.

6. The solar thermal power generation method according to claim 5, wherein when the solar heat cannot be collected, the heat storage medium that has stored heat and is contained in the high-temperature tank is supplied successively to an evaporator and a preheater, water generated from the saturated steam by the driving of the saturated steam turbine is supplied successively to the preheater and the evaporator, heat exchange is performed in the preheater between the heat storage medium and the water to heat up the water by heat release from the heat storage medium, heat exchange is performed in the evaporator between the heat storage medium and the water heated by the preheater to generate saturated steam from the water by heat release from the heat storage medium, the heat storage medium after the heat release in the preheater is contained in the low-temperature tank, and power generation is performed by driving the saturated steam turbine with the saturated steam generated in the evaporator.

7. The solar thermal power generation method according to claim 5, wherein when upward and downward fluctuations of direct normal irradiance occur, a ratio between a flow rate of the superheated steam to be supplied to the steam turbine and a flow rate of the superheated steam to be supplied to the heat storage heater is controlled to maintain a sum total of power generation output of the steam turbine and power generation output of the saturated steam turbine at a substantially constant level irrespective of the fluctuations of the direct normal irradiance.

8. The solar thermal power generation method according to claim 5, wherein when sharp upward fluctuations of the direct normal irradiance occur, power generation output of the saturated steam turbine is decreased such that a sum total of power generation output of the steam turbine and power generation output of the saturated steam turbine is maintained at a substantially constant level irrespective of the sharp upward fluctuations of the direct normal irradiance by causing part of the saturated steam introduced from the heat storage heater to the saturated steam turbine to bypass the saturated steam turbine.

9. The solar thermal power generation method according to claim 5, wherein when the direct normal irradiance drops significantly and difficulty in the collection of solar heat is expected, operation of the steam turbine is stopped and the heat exchange by the heat storage heater is stopped, the heat storage medium after storing the solar heat and being contained in the high-temperature tank is supplied successively to an evaporator and a preheater, water generated from the saturated steam by the driving of the saturated steam turbine is supplied successively to the preheater and the evaporator, heat exchange is performed in the preheater between the heat storage medium and the water to heat up the water by heat release from the heat storage medium, heat exchange is performed in the evaporator between the heat storage medium and the water heated by the preheater to generate saturated steam from the water by heat release from the heat storage medium, the heat storage medium after the heat release in the preheater is contained in the low-temperature tank, and power generation is performed by driving the saturated steam turbine with the saturated steam generated in the evaporator to secure certain power generation output.

* * * * *